Figure 1:
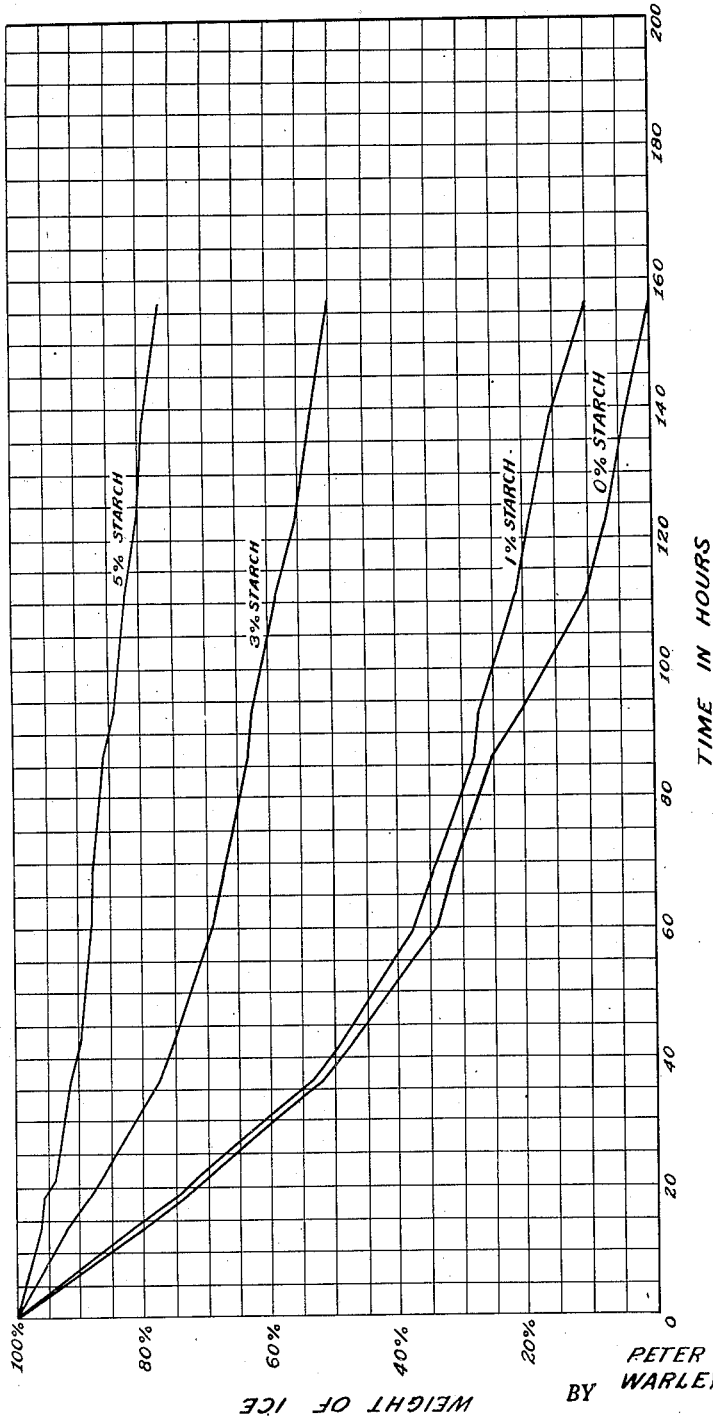

Patented Dec. 6, 1949

2,490,047

UNITED STATES PATENT OFFICE 2,490,047

SLOW-MELTING ICE

Peter S. Gilchrist, Jr., and Warley L. Parrott,
Charlotte, N. C.

Application May 13, 1947, Serial No. 747,828

3 Claims. (Cl. 252—67)

Our invention relates to treating ice to give it effectively a longer cooling life; and more particularly to incorporating in the ice a substance that prolongs melting of the ice, and absorbs and retains the ice water.

This ice water is held in contact with the ice by the absorbent material, instead of draining off to waste as normally occurs with ice water from untreated ice. The retained ice water, being at substantially freezing temperature, provides a cooling effect to the surrounding atmosphere similarly to that obtained from the ice itself. In this manner the effective cooling life of the ice is markedly extended, as will be demonstrated by the data and curves discussed below.

In accordance with our invention we incorporate in the water, which is to be frozen to form the ice, a material which upon thawing is highly absorbent of the ice water. Materials that we have found to work satisfactorily include the carbohydrates, such as for example, starch and flour obtained from corn or wheat. Other amylaceous products, such as potato, cassava or other root or tuber starches may be used. Likewise, starch or flour from barley, rye, and other grains may be employed, so long as they have the above described properties, upon thawing, of producing a hydrophilic material and preferably one that swells or becomes spongy so as to increase greatly its water absorbent and retaining capacity.

Corn starch and self-rising wheat flour are examples of materials that work very satisfactorily. Corn starch, for example, when used in accordance with our invention, produces a spongy mass that holds a relatively great amount of water and will retard the melting of the ice or semi-frozen water for a number of hours beyond the normal melting time.

The general procedure followed in preparing the product of our invention comprises first, making a paste of the amylaceous material by wetting out the starch in a small quantity of water, then adding more water and stirring to produce a fluid mixture, and heating this mixture for a sufficient length of time to rupture the starch granules and produce good gelation of the starch. The temperature required for this gelling treatment will vary with the types of amylaceous materials used. For example, pearl corn starch requires heating to about 165° F., while wheat flour, which contains about 10% protein and about 80% starch, requires a higher temperature, preferably as high as the boiling point of water, 212° F. After the starch has been gelled, tap water is added to bring the mixture up to the desired volume for freezing. In the usual practice, the amount of water added is sufficient to provide in the final ice an amount of about 1% to 5% by weight of starch (or other carbohydrate) and about 99% to 95% water. The starch and water mixture may be frozen in any conventional freezing or ice manufacturing equipment.

The amount of carbohydrate material to be used in the ice depends generally upon the desired degree of retardation of melting of the ice, and upon economical factors, such as the cost of the carbohydrate relative to the cost of the untreated ice and the savings effected by prolonging the useful life of the ice. An amount of as little as 1% of carbohydrate material, based on the total weight of the treated ice, shows an appreciable improvement in retardation of the normal melting rate or loss in weight by melting. Amounts of 2%, 3% and 5% show marked improvements, and in most cases it is not necessary to use more than about 5% as a maximum.

Figure 2:
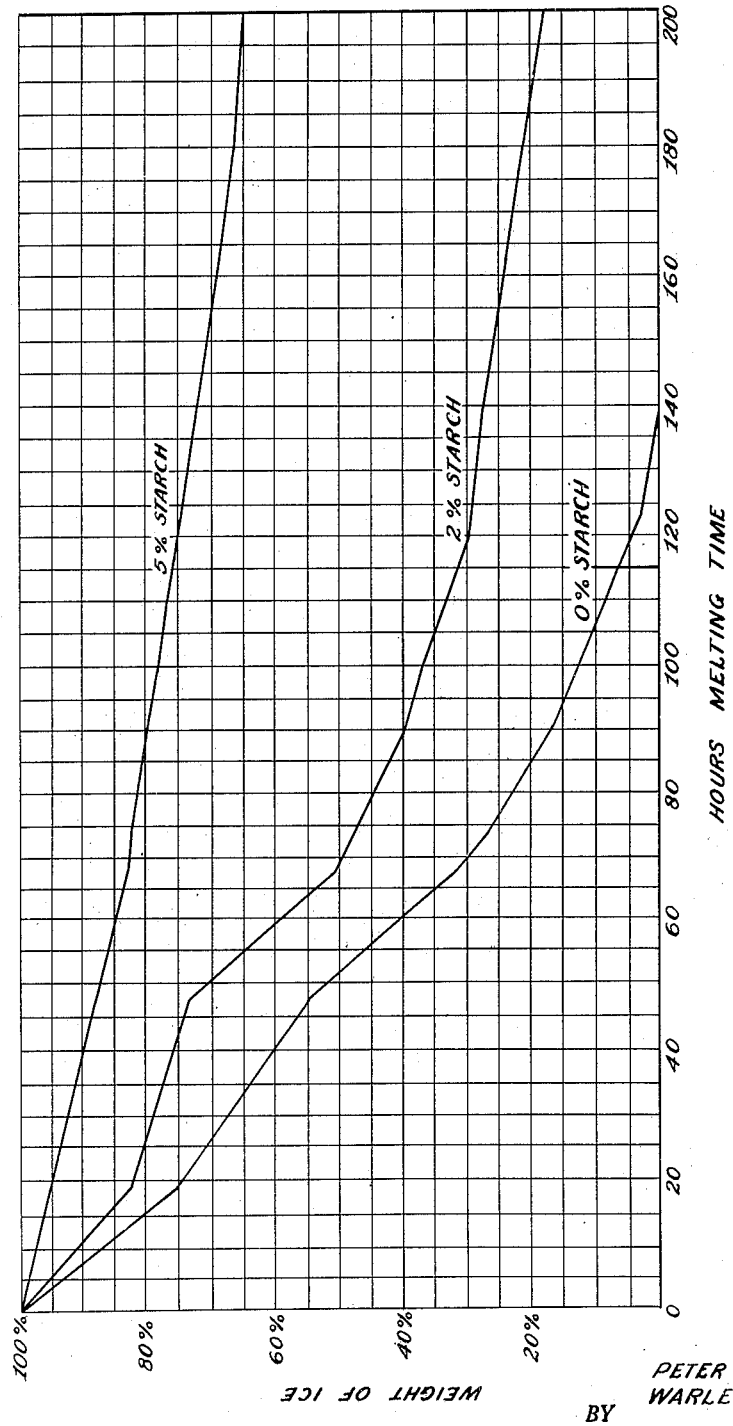

Graphic illustrations of the improvements obtained by using 1% to 5% of corn starch, as compared with untreated ice, are shown in the accompanying drawings in which:

Fig. 1 is a series of curves illustrating the differences in melting rates of the ice containing 0%, 1%, 3% and 5%, respectively, of starch; and, Fig. 2 is a similar series of curves illustrating the differences in melting rates of the ice containing 0%, 2% and 5% starch.

The curves shown in Figs. 1 and 2 are based upon melting tests carried out on 300 pound blocks of ice, containing the respective percentages of starch indicated. The starch was gelled and then incorporated in the ice in the manner described above and the ice blocks frozen in conventional ice making equipment. The frozen blocks were then placed in a large room in which the temperature was about 55° F. to 65° F., and permitted to melt in normal manner. The blocks were weighed at frequent intervals to determine the loss in weight, and from these data the curves shown in the drawings were prepared.

Referring now to the curves shown in Fig. 1 of the drawings, it will be noted that the untreated ice, containing 0% starch, was completely melted, that is, it had lost 100% of its original weight, in 157 hours. At this same period the blocks of treated ice still retained the following percentages of their original weight:

| | Per cent |
|---|---|
| 1% starch | 10 |
| 3% starch | 50 |
| 5% starch | 77 |

Referring to Fig. 2 in the drawings, it will be noted that the untreated ice, containing 0% starch, was completely melted, that is, had lost 100% of its original weight, in 140 hours. At this same period, the treated ice containing 2% of starch, had lost 72% in weight; and the treated ice containing 5% of starch, had lost only 28% of its original weight. And even at 200 hours, this treated ice containing 5% starch, had lost only 35% of its original weight.

The slow melting ice of our invention may be used for refrigeration purposes in general. It is particularly useful where ice is used in bulk or large quantities, such as for example, in the refrigeration of railway freight cars carrying fruits and vegetables or other perishable products. The prolonged life of this treated ice will enable the iced freight cars to travel very much longer distances without reicing; thus effecting substantial savings in time and labor.

Various changes and modifications may be made in the above described materials and procedures without departing from the scope of our invention as defined in the appended claims.

We claim:

1. An article of manufacture consisting of ice and about 1% to 5%, by weight, of a gelatinized starch dispersed therethrough for effectively prolonging the melting of the ice.

2. An article of manufacture consisting of ice and about 1% to 5%, by weight, of a gelatinized corn starch, dispersed therethrough for effectively prolonging the melting of the ice.

3. An article of manufacture consisting of ice and about 1% to 5%, by weight, of gelatinized wheat flour dispersed therethrough for effectively prolonging the melting of the ice.

PETER S. GILCHRIST, JR.
WARLEY L. PARROTT.

REFERENCES CITED

The following references are of record in the file of this patent:

UNITED STATES PATENTS

| Number | Name | Date |
|---|---|---|
| 1,123,537 | Huizer | Jan. 5, 1915 |
| 1,861,957 | De Remer | June 7, 1932 |
| 2,203,230 | Nitsche | June 4, 1940 |